United States Patent
Wisner et al.

(10) Patent No.: US 11,563,357 B2
(45) Date of Patent: Jan. 24, 2023

(54) CONNECTING DEVICE AND ELECTRIC MOTOR

(71) Applicant: Brose Fahrzeugteile SE & Co. Kommanditgesellschaft, Würzburg, Würzburg (DE)

(72) Inventors: Marko Wisner, Würzburg (DE); Janik Schulz, Würzburg (DE); Keshar Shendare, Pune (IN)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 404 days.

(21) Appl. No.: 16/639,166

(22) PCT Filed: Aug. 21, 2018

(86) PCT No.: PCT/EP2018/072482
§ 371 (c)(1),
(2) Date: Feb. 14, 2020

(87) PCT Pub. No.: WO2019/038248
PCT Pub. Date: Feb. 28, 2019

(65) Prior Publication Data
US 2020/0235631 A1    Jul. 23, 2020

(30) Foreign Application Priority Data
Aug. 23, 2017   (DE) .................... 10 2017 214 774.1

(51) Int. Cl.
*H02K 5/22*     (2006.01)
*H01R 12/53*    (2011.01)
(Continued)

(52) U.S. Cl.
CPC ............. *H02K 5/225* (2013.01); *H01R 12/53* (2013.01); *H01R 12/58* (2013.01); *B60K 11/04* (2013.01); *B60R 16/03* (2013.01)

(58) Field of Classification Search
CPC .......... H02K 5/225; H02K 5/22; H01R 12/53; H01R 12/58; B60K 11/04; B60R 16/03
See application file for complete search history.

(56) References Cited

U.S. PATENT DOCUMENTS 7,291,036 B1 *  11/2007  Daily ................... H02S 40/345
                                                     439/76.1
7,914,298 B2 *   3/2011  Lauermann ............ H02G 3/088
                                                     439/76.1
(Continued)

FOREIGN PATENT DOCUMENTS

DE          20022774 U1    4/2002
DE       102013002155 A1    7/2014
(Continued)

*Primary Examiner* — Harshad C Patel
(74) *Attorney, Agent, or Firm* — Brooks Kushman, P.C.

(57) ABSTRACT

A connection device for connecting a cable assembly with a plurality of cables to a printed circuit board of motor electronics arranged in a motor mounting of an electric motor, having a contact adapter with a number of current rails corresponding to the cables and with an injection molded housing, in which the current rails are embedded together in an injection molded manner, wherein the current rails protruding from the injection molded housing have first connection contacts for contacting the printed circuit board and second connection contacts for contacting the cable ends of the cables, and a connection housing having a first housing part and a second housing part that surrounds the second connecting contacts contacting the cable ends and that is joined to the injection molded housing of the contact adapter.

19 Claims, 4 Drawing Sheets

(51) Int. Cl.
*H01R 12/58* (2011.01)
*B60K 11/04* (2006.01)
*B60R 16/03* (2006.01)

(56) References Cited

U.S. PATENT DOCUMENTS

| | | | | |
|---|---|---|---|---|
| 8,672,706 | B2* | 3/2014 | Matsumoto | H01R 13/701 |
| | | | | 439/489 |
| 8,851,924 | B2* | 10/2014 | Fleischmann | H02K 5/225 |
| | | | | 439/607.57 |
| 10,193,410 | B2* | 1/2019 | Haga | H02K 3/50 |
| 2002/0093259 | A1* | 7/2002 | Sunaga | H02K 11/33 |
| | | | | 310/68 R |
| 2013/0049742 | A1* | 2/2013 | Ochiai | G01D 5/2013 |
| | | | | 324/207.16 |
| 2015/0280531 | A1* | 10/2015 | Zick | H02K 11/25 |
| | | | | 310/68 C |
| 2016/0377454 | A1* | 12/2016 | Ochiai | G01D 5/2046 |
| | | | | 324/207.17 |
| 2017/0093254 | A1* | 3/2017 | Schulz | H02K 11/33 |
| 2017/0126104 | A1* | 5/2017 | Yamanaka | H01R 12/55 |

FOREIGN PATENT DOCUMENTS

| | | |
|---|---|---|
| DE | 202014004732 U1 | 7/2014 |
| DE | 102013202860 A1 | 8/2014 |
| DE | 102013107144 A1 | 1/2015 |
| DE | 102013217993 A1 | 3/2015 |
| DE | 102016111620 A1 | 12/2016 |
| DE | 102016221600 A1 | 5/2017 |
| DE | 112015004476 T5 | 6/2018 |
| EP | 2164153 A1 | 3/2010 |
| JP | 2009189178 A | 8/2009 |
| JP | 2010028909 A | 2/2010 |
| JP | 2010273525 A | 12/2010 |
| JP | 2015204674 A | 11/2015 |
| WO | 2011137950 A1 | 11/2011 |
| WO | 20111137949 A1 | 11/2011 |
| WO | 2015059776 A1 | 4/2015 |
| WO | 2017022011 A1 | 2/2017 |

* cited by examiner

CONNECTING DEVICE AND ELECTRIC MOTOR

CROSS-REFERENCE TO RELATED APPLICATIONS

This application is the U.S. National Phase of PCT Application No. PCT/EP2018/072482 filed on Aug. 21, 2018, which claims priority to German Patent Application No. DE 10 2017 214 774.1, filed on Aug. 23, 2017, the disclosures of which are hereby incorporated in their entirety by reference herein.

TECHNICAL FIELD

The present disclosure relates to a connection device for connecting a cable assembly to an electronics circuit board of an electric motor for use in a vehicle.

BACKGROUND

Typically, motor electronics to be electrically connected to the on-board network of a motor vehicle have a connection terminal (connection interface, motor interface) which is led out of its (electronic) housing as a connection device, the connection contacts (connection points) of which are electrically isolated from each other and from the environment.

The electrical connection of the motor electronics to the on-board network is normally carried out with a number of cables of a cable assembly guided in a wiring loom, one cable assembly end or wiring loom end of which being provided with a plug-in connection and the other end of the cable assembly or wiring loom being electrically conductively connected to the motor electronics to be supplied via the connection contacts of the connection terminal. This electrical connection of the individual conductor ends of the cables of the cable assembly to the connection terminal can be established by a welded, soldered, clamped or crimped connection.

Such a connection device is also provided in particular in an electric motor already equipped with connecting cables, which is used, for example, as a drive of a radiator fan (radiator fan motor) of the motor vehicle. The radiator fan motor is operated to adjust the required cooling power by means of an electrical or electronic control circuit of the motor electronics. The radiator fan motor is powered via an on-board wiring loom, which is connected to an energy storage system (vehicle battery) of the motor vehicle. The cable assembly usually also includes control and/or signal cables of sensors or higher-level control devices in addition to the supply cables, i.e. the plus and minus poles of the supply voltage of the energy storage device or the on-board network.

Mechanical loads, such as tensile loads, between the wiring loom containing the cable assembly and the connection device of the electric motor are problematic with such connection devices or electric motor connections. Such tensile loads may lead to damage and/or separation of the electrical contact on the connection device or the motor connection.

Furthermore, environmental influences such as temperature fluctuations and humidity are problematic, as corrosion can occur as a result thereof on the connection contacts of the connection device, which can lead to high contact resistances and/or mechanical instability (contact wobble). A short circuit on the connection device that may occur as a consequence thereof may result in damage in the on-board network or in the motor electronics. In addition, the normally prescribed contact safety can be endangered. In order to protect the motor electronics, it is further important and desirable that reliable and dependable sealing of the connection device against the electronic housing is realized.

For this purpose, the motor electronics typically have a lead frame for contacting and interconnecting electronic components, such as an electrolytic capacitor or an inverter circuit. The lead frame is provided here at least partially as an insert with injection molding, wherein conductor tracks of the lead frame are led out as connecting contacts from the injection molding and the electronic housing. The injection molding of the lead frame thus enables reliable sealing of the cable input area of the connection device relative to the electronic housing, wherein additionally strain relief is also realized.

Disadvantageously, the integration of the sealing and strain relief function into the injection molded lead frame makes it difficult or even impossible to use circuit boards in motor electronics. This severely restricts flexibility in the configuration and design of the motor electronics.

SUMMARY

One or more objects of the present disclosure may be to provide a connection device that may provide an electrical connection of an on-board network to a printed circuit board of motor electronics. The present disclosure may include an electric motor with such a connection device. The connection device may be configured to connect an electric motor to a 48V supply voltage.

One or more objects may be achieved with regard to the connection device described in the present disclosure.

The connection device according to the present disclosure may be suitable to provide an electric motor connection or a motor interface for connecting a cable assembly to a circuit board of motor electronics arranged in a motor mount of an electric motor. The wiring loom may include a number or a plurality of lines, which are led to the connection device in a wiring loom, for example. The motor mount may be a housing attached to a motor housing of the electric motor, which is or may be covered by means of a lid to form a substantially closed electronic housing for the motor electronics. In this case, the motor mount, which is made of aluminum for example, and may include a motor mount floor appropriately coupled to the motor housing, which is enclosed circumferentially by an axially rising housing wall. The motor electronics are accommodated in the housing interior or electronics compartment bounded by the motor mount and the lid.

The connection device may include a contact adapter with a number of current rails corresponding to the number of cables and with an injection molded housing. The current rails are embedded together in the in particular electrically insulating injection molded housing, and are thus spaced apart from and electrically insulated from each other. The current rails have first and second connection contacts. The first connection contacts on the electronics side protrude from the injection molded housing and are provided for contacting the printed circuit board. The second contact contacts on the cable side are suitably formed for contacting the cable ends of the cables of the cable assembly.

The connection device may include a connection housing, which is composed of first and second housing parts. The housing parts are of a shell-shaped and lid-shaped form here, for example, and are assembled to form a cavity when the connection housing is in the assembled state, for example they are snapped together. The second connection contacts contacted with the conductor ends are arranged in the connection housing, wherein the connection housing is attached to the injection molded housing of the contact adapter. As a result, a particularly suitable connection device is implemented.

In contrast to the prior art, a separate, i.e. additional, contact adapter for the connection device is used instead of an injection molded lead frame of the motor electronics. The functions of a seal to the motor mount and lid i.e. the electronic housing as well as strain relief are carried out by the injection molded housing of the contact adapter, which is implemented as sheathing of the current rails. The contact adapter is thus a separate component from the motor electronics. This makes the use of printed circuit boards for the electronic components of motor electronics possible or at least significantly simplified.

The use of printed circuit boards for motor electronics is particularly advantageous in terms of flexibility in the design and construction of the electronics. For example, a modular or building block system of the motor electronics is possible. In particular, it is possible to use the same connection device for electric motors and motor electronics of different power classes. This reduces manufacturing costs and manufacturing complexity during the assembly of electronics. In addition, the printed circuit board enables particularly compact motor electronics in terms of installation space, which provides additional freedom.

The current rails injection molded or encased in the injection molded housing are formed, for example, as stampings in the form of flat conductor tracks. The injection molded housing may be formed of a thermally stable plastic material.

The connection housing protects the second connection contacts and the conductor ends against temperature fluctuations and humidity. This advantageously prevents the risk of corrosion on or between the second connection contacts and the conductor ends.

As one example, the second connecting contacts of the current rails may protrude from the injection molded housing. This means that the electrically conductive connection between the second connection contacts and the respective conductor ends may not be surrounded by an injection molding but may be arranged essentially exposed within the connection housing. This may simplify the electrical contacting of the second connection contacts with the conductor ends.

In order to improve mechanical stability, in particular with regard to the tensile relief or the tensile strength of the contacting between the conductor ends and the second connection contacts, it is possible that the cables of the cable assembly are clamped by parts of the connection housing, for example.

The second connection contacts are embodied as connecting lugs, which are electrically conductively connected to the conductor ends by means of a soldered connection. This ensures a particularly low-complexity and cost-effective connection of the connection device to the wiring loom. In an alternative embodiment, the connection is implemented as a welded joint or as a crimping, for example.

In one or more embodiments, a collar contour of the injection molded housing is encompassed by the first and second housing parts in a form-fitting manner when the connection housing is in the connected state. The form fit between the connection housing and the injection molded housing improves the strain relief of the connection device.

In an exemplary embodiment, the first connecting contacts of the lead frame are designed as pressfit contacts for the circuit board. This enables contacting of the printed circuit board in a particularly effort-reducing manner, which is advantageously transferred to the electronic assembly of the motor electronics in the motor mount. In an alternative embodiment, the first connection contacts are in the form of welded contacts or soldered contacts, for example.

In a conceivable further development, the injection molded housing of the contact adapter is embodied as a wall leadthrough of the housing wall of the motor mount. In particular, the housing wall may include a recess in which the injection molded housing is inserted. The injection molding housing may be form-fitted to the housing wall and thus attached to the motor mount, so that reliable and dependable strain relief is guaranteed. In this case, the injection molded housing may seal the recess. In other words, the motor mount and the lid may be sealed against the injection molded housing. Here, it is conceivable, for example, that the contact area between the injection molded housing and the motor mount is provided with additional sealing.

In another embodiment, an adhesive connection between the injection molded housing and the motor mount as well as the lid is provided as a fluid-tight seal.

In one or more embodiments, the injection molded housing of the contact adapter is or can be mechanically firmly coupled to the motor mount. For example, the injection molded housing is screwed to the motor mount. As a result, a particularly strain-relieving connection device is implemented.

In one or more embodiments, the cavity of the connection housing enclosed between the first housing part and the second housing part is filled with a cured casting compound. In this case, the connection housing conveniently comprises a filling opening that opens into the cavity, through which the curable casting compound is filled with the connection housing in the joined state. Subsequently, the casting compound is cured so that the cured casting compound encloses the second connection contacts and conductor ends. This mechanically stabilizes the second connection contacts and cable ends, which improves the strain relief of the connection device. As one example, the second connecting contacts and the cable ends are electrically insulated and sealed in the cured casting compound.

In one or more embodiments, a material with good adhesion properties, such as silicone or polyurethane (PUR), is used as a casting compound.

In an exemplary embodiment, the cable assembly may include at least three, or at least four, or at least five cables.

The electric motor according to one or more embodiments may be configured for use as an electric radiator fan motor of a motor vehicle. The electric motor is designed here, for example, with an external rotor, and is attached to a desired installation position by means of a motor mount. In this case, the motor mount accommodates motor electronics, which are or can be connected by means of a connection device described above to a motor vehicle on-board network. As one example, the connection device may provide a reliable and dependable motor operation.

In one or more embodiments, the connection device as described may be configured an electric motor to a 48V supply voltage. As a result, a reliable and dependable contacting of the electric motor to the 48V supply voltage may be realized. The connection device is therefore particularly suitable for this and is set up to connect the electric motor to a 48V on-board network (direct voltage, DC) of a motor vehicle.

BRIEF DESCRIPTION OF THE DRAWINGS

Exemplary embodiments of the invention are explained below in more detail on the basis of a drawing. In the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Matching parts and variables are always provided with the same reference characters in all the figures.

Figure 1:
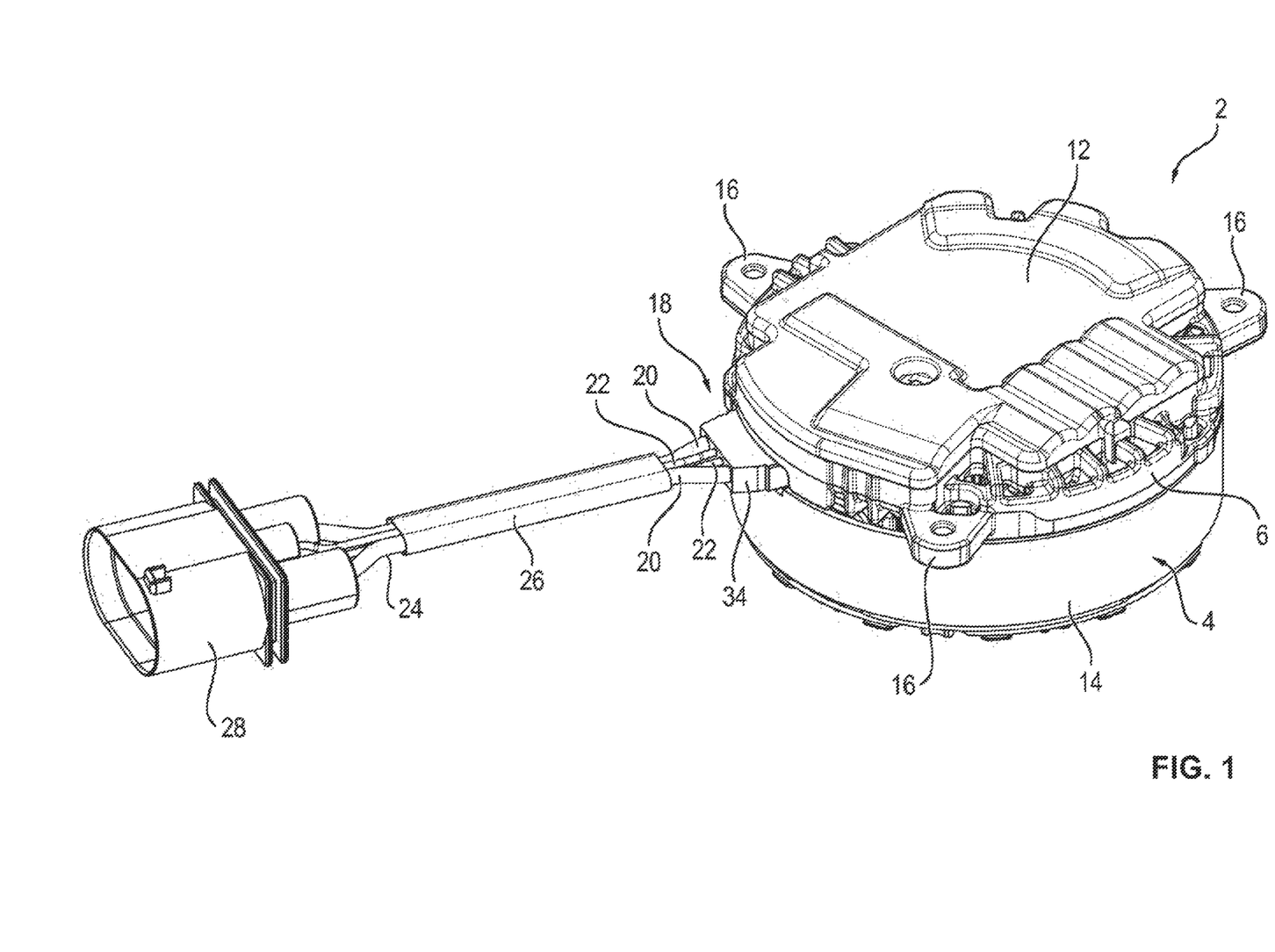
FIG. 1 shows in a perspective representation a radiator fan drive for a motor vehicle with integrated inverter electronics with a view of a connection device of an electric motor.

FIG. 1 shows an electric motor 2 of a fan for the radiator of a motor vehicle. The electric motor 2 may include a stator 4, which is, for example, wound with a three-phase rotary field winding in the form of coils. The electric motor 2 also may include a permanently excitable rotor that is not shown in detail and that is mounted inside the stator 4 so as to be rotatable around a motor axis. On an end face of the stator 4 is arranged an approximately disk-shaped motor mount 6, in which an electronic compartment 8 (FIG. 2) is inserted, in which motor electronics 10 are inserted. To protect against external influences, the electronic compartment 8 is sealed closed in the assembled state with a (housing compartment) lid (electronic compartment cover) 12.

The stator 4 is made of a sheet metal package, which is injection molded with a plastic sheath 14. The motor mount 6 may be manufactured as a single-piece die-cast part made of an aluminum material. The lid 12 in this embodiment is implemented as an injection molded part made of plastic. The fastening of the electric motor 2 and thus of the entire fan on the motor vehicle is carried out here by means of the motor mount 6, which may include three screw flaps 16 that are circumferentially distributed and protruding from the outer circumference for this purpose.

The electric motor 2 may include a connection device 18, by means of which the motor electronics 10 accommodated in the electronics compartment 8 are connected to cables 20, 22 of a cable assembly 24 of a wiring loom 26. The cable assembly 24 in this exemplary embodiment comprises two supply cables 20 as well as two signal or control cables 22. Due to the necessary current load capacity, the supply cables 20 have a comparatively large cable diameter compared to the signal or control cables 22. The wiring loom 26 is equipped with a plug connector 28 for connection to a motor vehicle on-board network at a cable end that is remote from the electric motor 2. The vehicle on-board network is designed, for example, as a 24V or 48V on-board network (direct voltage, DC).

Figure 2:
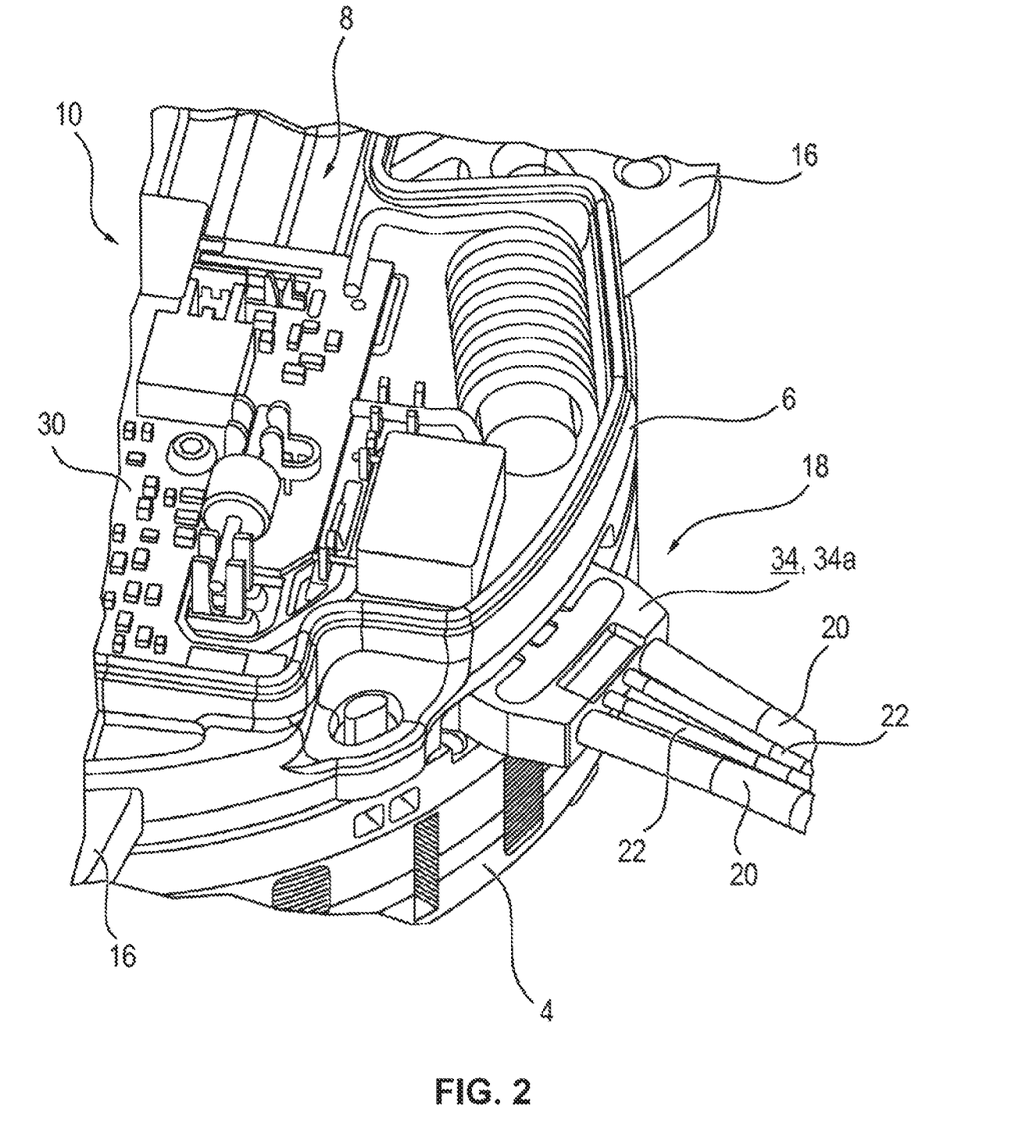
FIG. 2 shows in a perspective representation and in detail motor electronics in the area of the connection device in a first embodiment.
Figure 3:
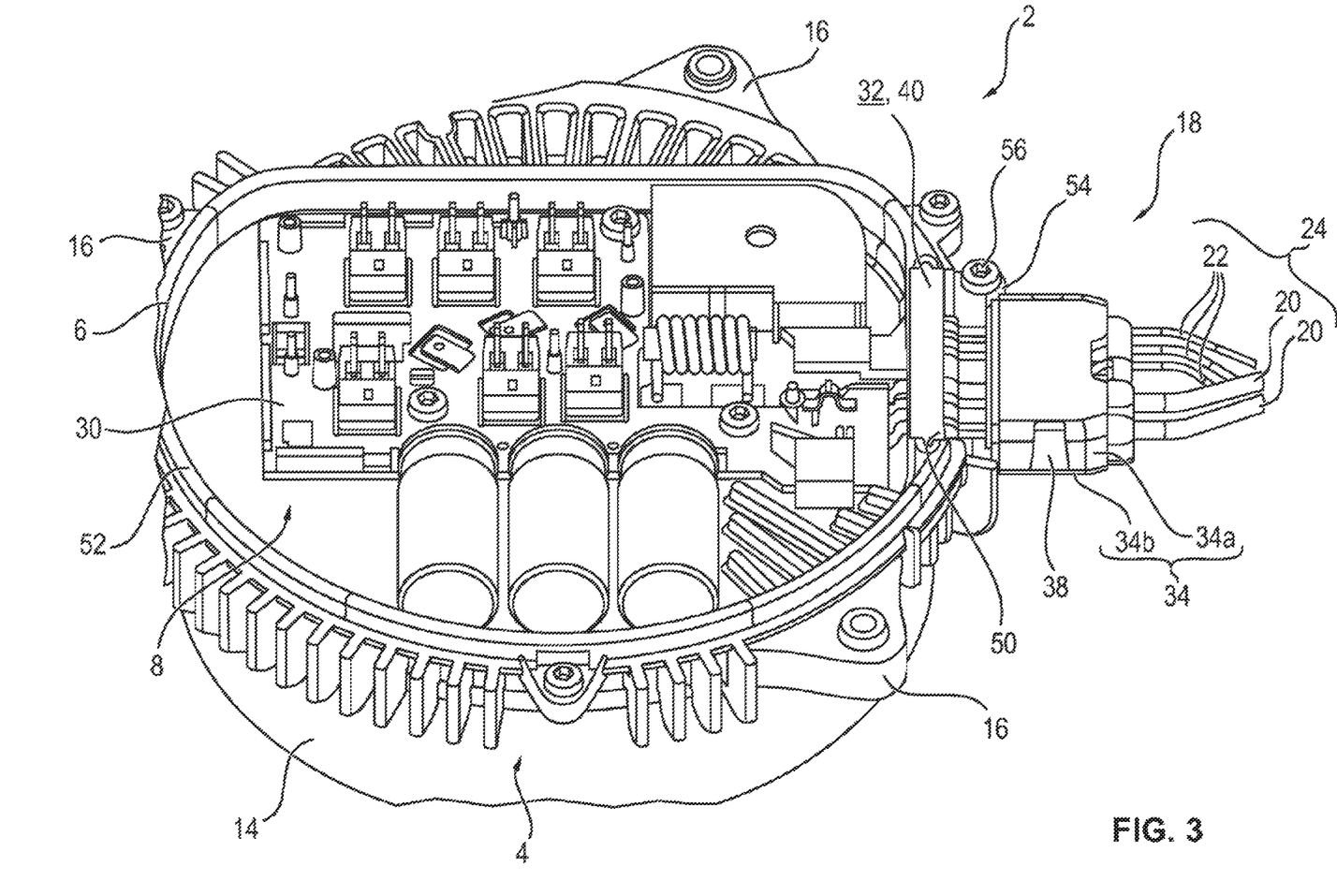
FIG. 3 shows in a perspective representation and in detail motor electronics in the area of the connection device in a second embodiment.
Figure 4:
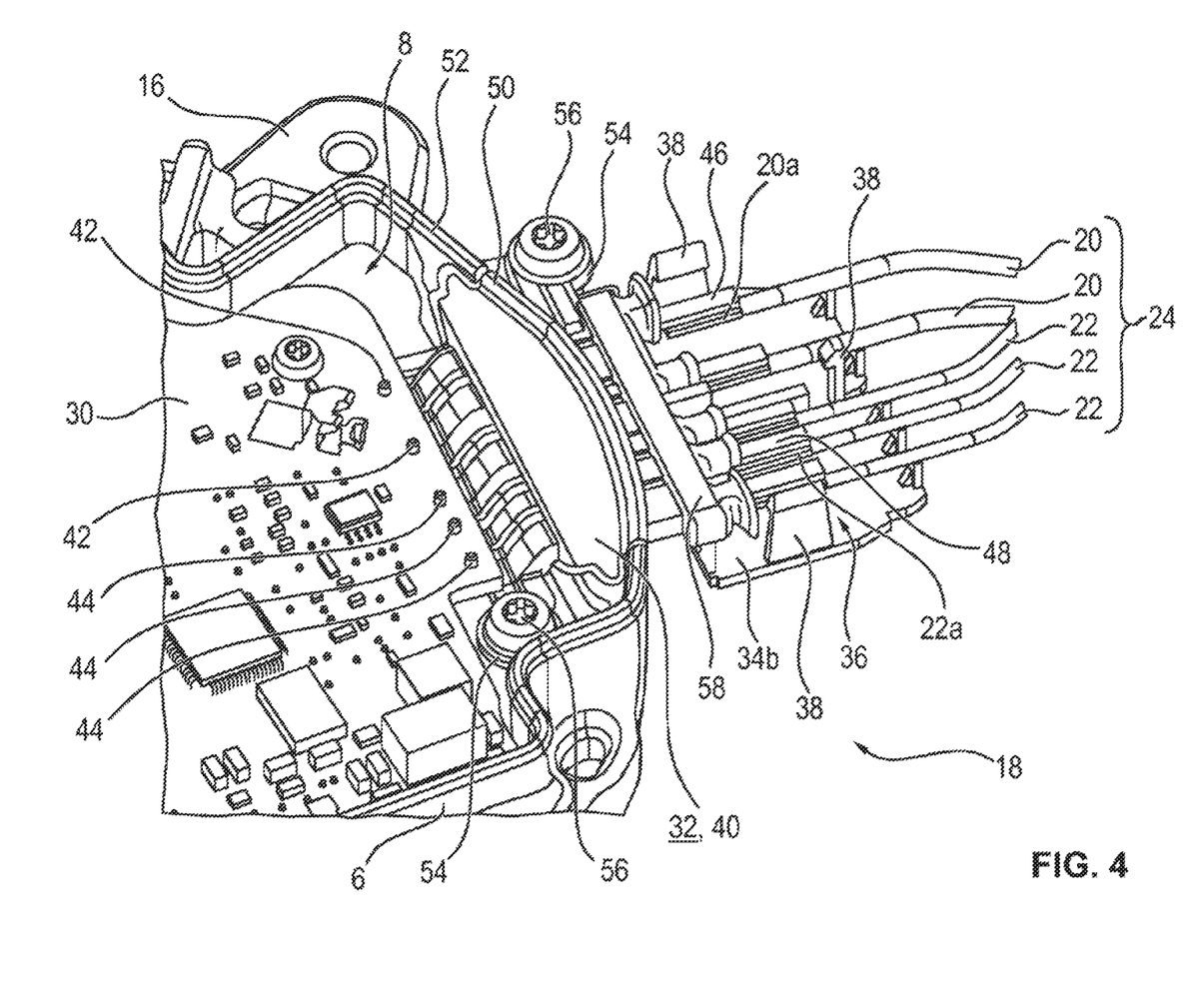
FIG. 4 shows in a perspective representation and in detail motor electronics with a partially disassembled connection device in a third embodiment.

In FIGS. 2 to 4 different embodiments of the motor electronics 10 and the respective connection device 18 are shown with the lid 12 removed. In the embodiments of FIG. 3 and FIG. 4 the cable assemblies 24 each have two supply cables 20 and three control or signal cables 22. The motor electronics 10 may always have a circuit board 30, on which electronic components of an inverter circuit that is not referred to in detail are arranged. In the embodiment of FIG. 2, the connection device 18 is arranged between the stator 4 and the motor mount 6.

FIGS. 2 to 4 show in a perspective view the motor electronics 10 arranged in the electronics compartment 8 with a view of the connection device 18. Here the connection device 18 essentially forms an electric motor interface or a motor connection between the motor electronics 10 and the wiring loom 26. When the radiator fan is in operation, the electric motor 2 is fed with a direct current via the supply cables 20 connected in an unspecified manner to a vehicle energy storage system (vehicle battery). The control or signal cables 22 are used for controlling the electric motor 2 or for data exchange between the motor electronics 10 and motor vehicle electronics. For example, with the radiator fan in operation control commands are transmitted via the control or signal cables 22 from the motor vehicle electronics to the electric motor 2 or operating information of the electric motor 2, such as the (motor) speed, is transmitted to the motor vehicle electronics.

The construction of the connection device 18 is described below based in particular on FIG. 4.

The connection device 18 may include a contact adapter 32 and a connection housing 34 coupled thereto. The connection housing 34 is composed of a first, approximately shell-like housing part 34a and a second, approximately lid-like or floor-like housing part 34b so as to form a cavity 36. The housing parts 34a, 34b, and thus the connection housing 34, are made of plastic as injection molded parts. The housing part 34b may include three locking tongues 38, which snap fit with corresponding latching receptacles of the housing part 34a when joining the housing parts 34a, 34b.

The contact adapter 32 may include an injection molded housing 40 made of an insulating plastic material. A number of current rails that are embedded in the injection molded housing 40 are injection molded as inserts with the plastic material of the injection molded housing 40. The number of current rails corresponds to the number of cables 20, 22 of the cable assembly 24. In the illustrated embodiment, five current rails are thus provided for the five cables 20, 22 of the cable assembly 24. The current rails are provided with reference characters in this case only based on the current rail ends 42, 44, 46, 48 protruding from the injection molded housing 40, which are also referred to below as first connecting contacts 42, 44 and second connecting contacts 46, 48. The current rails are produced as flat conductor-like conductor tracks by means of a punching and bending process.

The connected contacts 46, 48 embodied as flat connection lugs are led out of the end face of the injection molded housing 40 on the wiring loom side and thus protrude at least partially into the cavity 36 of the connection housing 34. In the illustrated embodiment, two current rails are connected by means of the connection contacts 46 to a respective supply cable 20 and three current rails are led by means of the connection contacts 48 to the signal or control cables 22. For electrically conductive connection, the conductive wires of the cables 20, 22 are exposed at the respective cable ends 20a, 22a and are soldered or welded to the respective connection contacts 46, 48. In FIG. 4, the cable ends 20a, 22a and the connecting contacts 46, 48 are only provided with reference characters by way of example.

In the illustrated embodiment of FIG. 4, the connection contacts 42, 44 of the contact adapter 32 on the electronic compartment side are embodied as pressfit contacts and are electrically conductively connected to the circuit board 30 by plug contacting. The connection contacts 42 assigned to the connection contacts 46 are led here, for example, to an intermediate circuit of the circuit board 30, wherein the connection contacts 44 assigned to the connection contacts 48 are led to a controller or a control unit of the motor electronics 10.

The housing wall of the motor mount 6 encompassing the electronic compartment 8 may include a recess or holder that is not referred to in detail in the assembly area of the connection device 18, in which the injection molded housing 40 is inserted as a type of wall leadthrough. The injection molded housing 40 is inserted so as to be flush and sealing in the recess of the motor mount 6. In this case, the injection molded housing 40 may include a rising sealing collar 50 that is flush with a circumferential axial sealing edge 52 of the motor mount 6. The sealing collar 50 and the sealing edge 52 may be used to provide a fluid-tight sealing with respect to the lid 12. The sealing edge 52 can also be implemented here as an adhesive connection, for example. In the assembled state, the electronic compartment 8 is thus reliably and dependably sealed with respect to the lid 12, so that the motor electronics 10 accommodated therein are securely protected against external influences.

The injection molded housing 40 may include molded fastening tabs 54 for mechanical fixing of the contact adapter 32—and thus the connection device 18—on the motor mount 6. As is apparent in the exemplary embodiment of FIG. 3 and FIG. 4, the injection molded housing 40 is mechanically securely attached to the motor mount 6 at the fastening tab 54 by means of a respective fastening screw 56. In the embodiment of FIG. 3, the injection molded housing 40 may include one fastening tab 54 and in the embodiment of FIG. 4 two fastening tabs 54.

The injection molded housing 40 further may include a collar contour or a form-fit contour 58 arranged between the sealing collar 50 and the connection contacts 46, 48. The collar contour 58 is formed as one piece, i.e. is in one piece or monolithic, on the body of the injection molded housing 40 so as to rise up. In the assembled or joined state of the connection device 18, the collar contour 58 is encompassed by the housing parts 34a, 34b of the connection housing 34 in a form-fitting manner, so that the connection housing 34 is securely attached to the contact adapter 32.

The connection device 18 shown in FIGS. 3 and 4 is suitable and is set up for the connection of the electric motor 2 or the motor electronics 10 thereof to a 48V supply voltage of a motor vehicle on-board network, i.e. to a 48V on-board network. The supply cables 20 are embodied here as two power cables, for example.

The invention is not limited to the embodiments described above. Rather, other variants of the invention can also be derived therefrom by the person skilled in the art without departing from the subject matter of the invention. In addition, all the individual features described in connection with the exemplary embodiments can also be combined in other ways without departing from the subject matter of the invention.

For example, it is conceivable that the cavity 36 of the connection housing 34 is filled with a cured or curable casting compound. In the cured state of the casting compound, the connection contacts 46, 48 and cable ends 20a, 22a are dependably embedded so as to be tension-resistant, electrically insulating and fluid-tight.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

REFERENCE CHARACTER LIST

2 Electric motor
4 Stator
6 Motor mount
8 Electronic compartment
10 Motor electronics
12 Lid
14 Plastic casing
16 Screw flaps
18 Connection device
20 Cable/supply cable
20a Cable end
22 Cable/signal or control cable
22a Cable end
24 Cable assembly
26 Wiring loom
28 Plug connector
30 Printed circuit board
32 Contact adapter
34 Connection housing
34a, 34b Housing part
36 Cavity
38 Latching tongue
40 Injection molded housing
42, 44 Connection contact
46, 48 Connection contact
50 Sealing collar
52 Sealing edge
54 Fastening tab
56 Fastening screw
58 Collar contour While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A connection device for connecting a cable assembly, provided with a plurality of cables, to a printed circuit board of motor electronics arranged in a motor mount of an electric motor, the connection device comprising:

a contact adapter provided with a number of current rails each corresponding to each of the cables of the plurality of cables and an injection molded housing, wherein each of the current rails protrude from and are embedded in the injection molded housing and include first connection contacts, contacting the printed circuit board, and second connection contacts contacting cable ends of each of the cables; and a connection housing having a first housing part and a second housing part enclosing the second connection contacts and contacting the cable ends, wherein the second housing part is joined to the injection molded housing, wherein in an assembled state, the connection housing defines a cavity enclosed by the first housing part and the second housing part, wherein the cavity is filled with a cured casting compound.

2. The connection device of claim 1, wherein the second connection contacts protrude from the injection molded housing.

3. The connection device of claim 1, wherein the second connection contacts are formed by connecting lugs soldered to the cable ends.

4. The connection device of claim 1, wherein when the connection housing is in a joined state, the first and second housing parts engage around a collar contour of the injection molded housing in a form-fitting manner.

5. The connection device of claim 1, wherein the first connection contacts are formed by pressfit contacts to contact the printed circuit board to form a press-fit condition.

6. The connection device claim 1, wherein the injection molded housing extends through a housing wall of the motor mount.

7. The connection device of claim 1, wherein the injection molded housing is mechanically coupled to the motor mount.

8. An electric motor for use in a motor vehicle radiator fan, the electric motor comprising:
   a motor mount;
   a printed circuit board arranged on the motor mount;
   a cable assembly including a number of cables, wherein each of the cables includes a cable end; and
   a connection device including, a contact adapter including an injection molded housing and a number of current rails partially embedded in the injection molded housing, wherein each of the current rails include a first connection contact and a second connection contact each extending from the injection molded housing wherein the first connection contact of each of the current rails contacts the printed circuit board and the second connection contact of each of the current rails contacts the cable end of each of the cables, and a connection housing including a first housing part and a second housing part,
   wherein the first housing part and the second housing part enclose the second connection contact and collectively form a cavity enclosed by the first housing part and the second housing part, wherein the cavity is filled with a cured casting compound.

9. The connection device of claim 1, wherein the contact adapter is configured to receive a 48V supply voltage.

10. The electric motor of claim 8, wherein the second connection contacts are each formed by connecting lugs soldered to each of the cable ends.

11. The electric motor of claim 8, further comprising a collar contour extending from the injection molded housing, wherein when the first housing part is fixed to the second housing part, the first and second housing parts enclose the collar contour.

12. The electric motor of claim 11, further comprising a sealing collar integrally formed with and extending from the injection molded housing, wherein the motor mount includes a wall defining a sealing edge, wherein the sealing collar engages a portion of the sealing edge.

13. The electric motor of claim 12, wherein each of the first connection contacts engage the printed circuit board to form a press-fit condition between each of the first connection contacts and the printed circuit board.

14. The electric motor of claim 12, further comprising a floor extending between portions of the wall of the motor mount, wherein the wall and the floor define a cavity that receives the printed circuit board.

15. The electric motor of claim 8, wherein the first housing part includes a latching tongue, wherein the latching tongue is configured to engage the second housing part to form a snap-fit condition between the latching tongue and the second housing part.

16. The electric motor of claim 8, wherein each of the current rails are formed by a stamped conductive track.

17. A connection device for an electric motor provided with a motor mount and a printed circuit board disposed in the motor mount, the connection device comprising:
   a contact adapter including a plastic housing and a number of current rails partially embedded in the plastic housing, wherein each of the current rails includes a first connection contact and a second connection contact each extending from the injection molded housing wherein the first connection contact of each of the current rails contacts the printed circuit board and the second connection contact of each of the current rails contacts the cable end of each of the cables; and
   a connection housing enclosing the second connection contact and collectively form a cavity enclosed by the first housing part and the second housing part, wherein the cavity is filled with a cured casting compound so that the cured casting compound seals and electrically insulates the second connection contact of each of the current rails contacts the cable end of each of the cables.

18. The connection device of claim 17, further comprising a fastening tab integrally formed with the plastic housing, wherein the fastening tab defines an aperture configured to receive a fastener to fix the plastic housing to the motor mount.

19. The connection device of claim 18, wherein the fastening tab is disposed in the motor mount.

* * * * *